No. 615,229. Patented Nov. 29, 1898.
J. H. BARTON.
PRISMATIC BINOCULAR FIELD OR OPERA GLASSES.
(Application filed July 6, 1898.)
(No Model.)
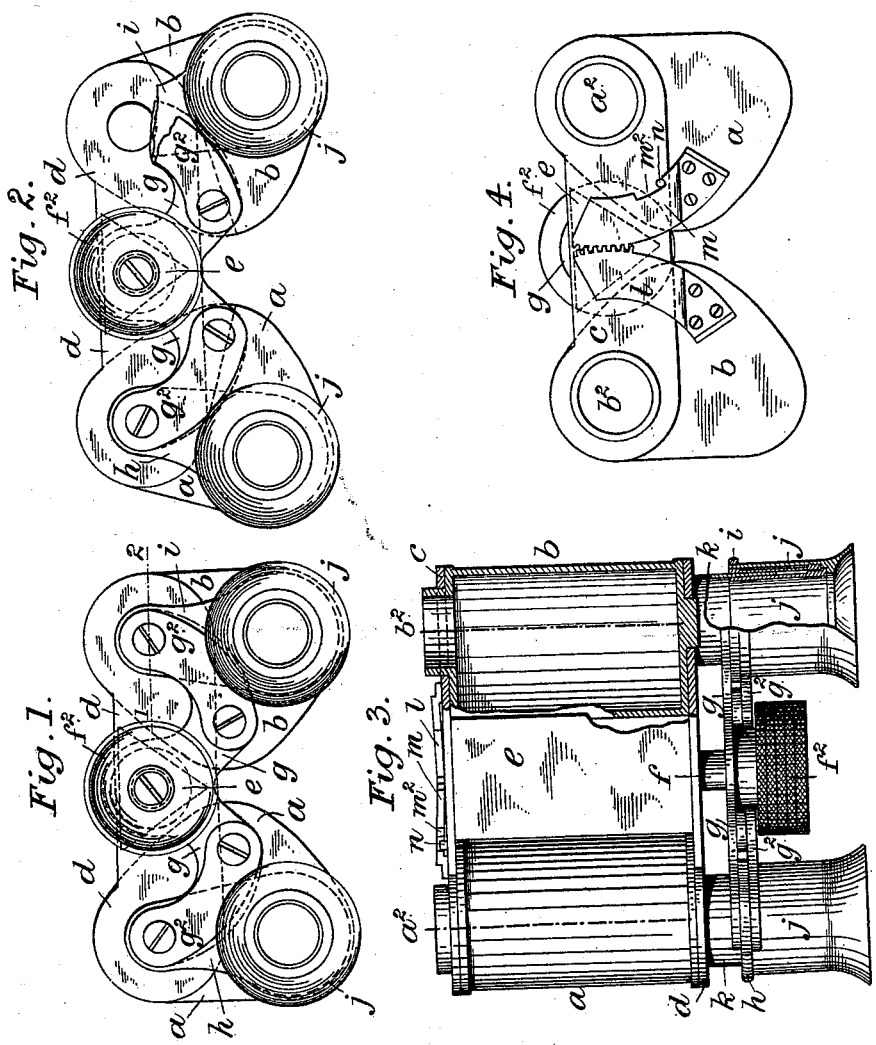
WITNESSES:
F. W. Wright
S. C. Cronin
INVENTOR
JOHN HENRY BARTON
BY
Howson and Howson
HIS ATTORNEYS.

UNITED STATES PATENT OFFICE.

JOHN HENRY BARTON, OF LONDON, ENGLAND.

PRISMATIC BINOCULAR FIELD OR OPERA GLASS.

SPECIFICATION forming part of Letters Patent No. 615,229, dated November 29, 1898.

Application filed July 6, 1898. Serial No. 685,265. (No model.)

*To all whom it may concern:*

Be it known that I, JOHN HENRY BARTON, optician's assistant, a subject of the Queen of Great Britain and Ireland, and a resident of 19 Honeywell road, Wandsworth Common, in the county of London, England, have invented certain new and useful Improvements in Prismatic Binocular Field and Opera Glasses, (for which I have applied for a patent in Great Britain, No. 19,255, dated August 20, 1897,) which invention is fully set forth in the following specification.

This invention relates to the arrangements for focusing and adjusting prismatic binocular field and opera glasses—that is, glasses in which increased magnifying power is obtained within a short length by directing the rays alternately in either direction by reflecting prisms between the objectives and the eyepieces and the distance of the eyepieces from each other being adjustable to suit different uses; and the object of the invention is to obtain in a rigid and compact form great facility in the adjustments necessary to the convenient use of this class of instrument, the arrangement being such that the distance apart of the eyepieces is varied without varying the distance apart of the objectives.

I will describe a manner in which my invention may be carried into effect, reference being had to the accompanying drawings.

Figures 1 and 2 are end views at the eyepiece end, showing, respectively, the eyepieces adjusted at their least distance apart and Fig. 2 showing them adjusted at their greatest distance apart. Fig. 3 is a plan, partly in section, on the line 1 2, Fig. 1; and Fig. 4 is an end view at the objective end of the instrument.

The two prismatic telescopes forming the right and left main bodies $a$ $b$ of the instrument are mounted between two bars $c$ $d$ in such manner that the eyepieces of the instrument can readily be adjusted for difference in the width between the eyes of various users without altering the relative positions of the objectives by turning the bodies $a$ and $b$ about the two centers $a^2$ $b^2$, which are the optical centers of the objectives. As shown in the drawings, the bodies $a$ and $b$ are each mounted between the bars $c$ $d$, each being supported at one end by the pin or short trunnion $t$ entering bearings in the bar $d$ and at the other end by the tubes of the objectives, which are attached to the bodies $a$ and $b$ and work in orifices in the bar $c$.

Between the mid portions of the aforesaid bars $c$ $d$ is a piece $e$, preferably of triangular shape in cross-section, in which is a screw-nut in which works a screw on the pillar $f$, which carries a third bar $g$, and at each of the extremities of this third bar is a jointed arm $h$ $i$, the centers of motion of these two jointed arms being the optical centers of the objectives, the other ends of these said arms being attached to the eyepieces of the instrument. By means of the milled head $f^2$, carried by the pillar $f$, the instrument is focused as the bar $g$ and arms $h$ $i$ move the tubes $j$, carrying the eyepieces, to and fro along the tubes $k$. The bar $g$ is shown as being provided with outside strengthening-pieces $g^2$.

As the right and left bodies $a$ $b$ of the instrument are turned about the optical centers of the objectives in the manner aforesaid the eyepieces are adjusted to different distances apart without altering the distance apart of the objectives. In order that each eyepiece may move simultaneously and to the same degree, the bodies $a$ and $b$ have attached to them means by which the motion of the one is conveyed to the other. This is shown in the drawings as being effected by curved bars $l$ $m$, with engaging-teeth in segments of circles struck, respectively, from the optical centers, upon which the bodies $a$ and $b$ turn. The stop $n$ on the bar $c$ limits the motion in either direction by coming against stops formed by the ends of the slot $m^2$ in the bar $m$.

I have omitted the prisms and lenses from the drawings, as their representation is not necessary for the understanding of my invention.

Having now particularly described and ascertained the nature of my said invention and in what manner the same is to be performed, I declare that what I claim is—

1. In prismatic binocular field or opera glasses, the combination with the objectives, of bodies carrying the prisms, eyepieces movably mounted with respect to said objectives, and means adapted to impart to said eyepieces partial rotary movement about the optical centers of the objectives, substantially as described.

2. In prismatic binocular field or opera glasses, the combination with the objectives, of cross-bars, bodies carrying the prisms and eyepieces mounted between said cross-bars, a connecting-piece between said bars, and means for imparting partial rotary movement to the said bodies about the optical centers of the objectives, substantially as described.

3. In prismatic binocular field or opera glasses, the combination with the objectives, of bodies carrying the prisms and eyepieces mounted thereon, mechanism for imparting partial rotary movement to said eyepieces about the optical centers of the objectives, said mechanism being so constructed and arranged as to cause the eyepieces to move equally and simultaneously, substantially as described.

4. In prismatic binocular field or opera glasses, the combination with the objectives, of cross-bars, bodies carrying the prisms and eyepieces rotatably mounted in said bars, a connecting-piece between said bars, a rotatable pillar mounted in said connecting-piece and having a bar extending therefrom, and arms connecting said bar with the eyepieces, substantially as described.

In testimony whereof I have signed this specification in the presence of two subscribing witnesses.

JOHN HENRY BARTON.

Witnesses:
WILLIAM FREDERICK UPTON,
RUDOLPH CHARLES NICKOL.